(12) United States Patent
Han

(10) Patent No.: US 12,271,722 B2
(45) Date of Patent: Apr. 8, 2025

(54) APPLICATION INSTALLATION METHOD AND APPARATUS, TERMINAL DEVICE, AND STORAGE MEDIUM

(71) Applicant: HUAWEI TECHNOLOGIES CO., LTD., Shenzhen (CN)

(72) Inventor: Guohui Han, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 80 days.

(21) Appl. No.: 17/979,198

(22) Filed: Nov. 2, 2022

(65) Prior Publication Data
US 2023/0051434 A1 Feb. 16, 2023

Related U.S. Application Data

(63) Continuation of application No. PCT/CN2021/082132, filed on Mar. 22, 2021.

(30) Foreign Application Priority Data

May 9, 2020 (CN) .......................... 202010385698.9

(51) Int. Cl.
G06F 8/61 (2018.01)
G06F 3/04817 (2022.01)
G06F 3/0486 (2013.01)

(52) U.S. Cl.
CPC ............ G06F 8/61 (2013.01); G06F 3/04817 (2013.01); G06F 3/0486 (2013.01)

(58) Field of Classification Search
CPC ....... G06F 3/0486; G06F 3/04817; G06F 8/61
See application file for complete search history.

(56) References Cited

U.S. PATENT DOCUMENTS

2007/0157100 A1  7/2007  Wiggen
2011/0246978 A1* 10/2011  Alfano .................... H04L 41/12
                                                  709/227
(Continued)

FOREIGN PATENT DOCUMENTS

CN    103618930 A     3/2014
CN    103677956 A  *  3/2014
(Continued)

OTHER PUBLICATIONS

Albertos Marco, "Collaborative e-Learning through Drag&Share in Synchronous Shared Workspaces", 2013.*

Primary Examiner — Phillip H Nguyen
(74) Attorney, Agent, or Firm — Maier & Maier, PLLC

(57) ABSTRACT

An application installation method and apparatus, a terminal device, and a storage medium are provided, and are applicable to the terminal control field. The method includes: a first device obtains installation information of a first application from a second device when the first device detects a specified operation on the first application in a current display interface, where the first application is an application on a home screen of the second device, and the home screen of the second device is displayed in the current display interface of the first device; and the first device installs the first application based on the installation information of the first application. The method can conveniently implement application sharing between devices in a multi-screen collaborative operation process.

18 Claims, 11 Drawing Sheets

(56) References Cited

U.S. PATENT DOCUMENTS

| | | | |
|---|---|---|---|
| 2012/0272232 A1 | 10/2012 | Song | |
| 2014/0032758 A1* | 1/2014 | Barton | H04L 41/00 709/225 |
| 2014/0129643 A1* | 5/2014 | Cho | H04L 65/1069 709/205 |
| 2015/0067540 A1* | 3/2015 | Yang | H04L 12/1822 715/753 |

FOREIGN PATENT DOCUMENTS

| | | | |
|---|---|---|---|
| CN | 104346190 A | | 2/2015 |
| CN | 104767779 A | | 7/2015 |
| CN | 105389175 A | | 3/2016 |
| CN | 105446760 A | * | 3/2016 |
| CN | 105516335 A | | 4/2016 |
| CN | 105700923 A | | 6/2016 |
| CN | 106471481 A | | 3/2017 |
| CN | 106686536 A | | 5/2017 |

\* cited by examiner

APPLICATION INSTALLATION METHOD AND APPARATUS, TERMINAL DEVICE, AND STORAGE MEDIUM

CROSS-REFERENCE TO RELATED APPLICATIONS

This application is a continuation of International Application No. PCT/CN2021/082132, filed on Mar. 22, 2021, which claims priority to Chinese Patent Application No. 202010385698.9, filed on May 9, 2020. The disclosures of the aforementioned applications are hereby incorporated by reference in their entireties.

TECHNICAL FIELD

The embodiments relate to the field of terminal control technologies, an application installation method and apparatus, a terminal device, and a storage medium.

BACKGROUND

With development of communications software technologies, there are increasing requirements for multi-screen collaborative operations between devices such as a mobile phone, a tablet, and a large-screen television. However, in a process of performing a multi-screen collaborative operation on devices, an application on each device is independently installed and run, that is, an application cannot be shared between devices.

For example, in a scenario of interaction between a mobile phone and a tablet, when a user wants to experience, on the mobile phone, an application installed on the tablet, the user needs to search for and install a same application on the mobile phone; and when the user wants to experience, on the tablet, an application installed on the mobile phone, the user needs to search for and install a same application on the tablet. Operations are inconvenient.

SUMMARY

In view of this, the embodiments may provide an application installation method and apparatus, a terminal device, and a storage medium, to implement application sharing between devices in a multi-screen collaborative operation process.

According to a first aspect, an embodiment may provide an application installation method, including:
a first device obtains installation information of a first application from a second device when the first device detects a specified operation on the first application in a current display interface, where the first application is an application on a home screen of the second device, and the home screen of the second device is displayed in the current display interface of the first device; and
the first device installs the first application based on the installation information of the first application.

In a process of performing a multi-screen collaborative operation on the first device and the second device, a screen window of the second device is displayed in a display interface of the first device. When the home screen of the second device is displayed in the display interface of the first device, if a user wants to experience, on the first device, an application installed on the second device, the user only needs to perform, in the display interface of the first device, a specified operation on the related application on the home screen of the second device, for example, tapping or dragging an icon of the related application on the home screen of the second device. Then, the first device obtains installation information of the application from the second device, and automatically completes installation of the application based on the installation information. It can be understood that, in the application installation method according to this application, application sharing between devices can be conveniently implemented in a multi-screen collaborative operation process.

Further, the specified operation on the first application in the current display interface may include:
an operation of dragging an icon of the first application in the current display interface to a target area, where the target area is an area in the current display interface of the first device other than an area in which the home screen of the second device is located.

Because the home screen of the second device is displayed in the current display interface of the first device, the user may conveniently perform the operation in the current display interface of the first device to drag the application icon on the home screen of the second device to the area in the current display interface of the first device other than the home screen of the second device. This operation is equivalent to triggering the first device to install the application corresponding to the application icon on the second device.

Further, the application installation method may further include:
when the first device detects an operation of dragging an icon of a second application in the target area to the area in which the home screen of the second device is located, the first device sends installation information of the second application to the second device, to indicate the second device to install the second application based on the installation information of the second application.

The user may further perform the operation in the current display interface of the first device to drag the application icon in the area (which is usually a home screen of the first device) in the current display interface of the first device other than the home screen of the second device to the home screen of the second device. This operation is equivalent to triggering the second device to install the application corresponding to the application icon on the first device.

Further, that a first device obtains installation information of a first application from a second device may include:
the first device obtains an installation package of the first application or attribute information of the first application from the second device if the first device detects that the first application is not installed on the first device.

Correspondingly, that the first device installs the first application based on the installation information of the first application may include:
the first device installs the first application by using the installation package of the first application if the first device obtains the installation package of the first application from the second device; or
if the first device obtains the attribute information of the first application from the second device, the first device searches the first device or a server for the installation package of the first application based on the attribute information and installs the first application by using the found installation package of the first application.

When the first device detects the specified operation on the first application in the current display interface, the first device first detects whether the first application is installed on the first device. If the first application is installed on the first device, the first device ignores the detected specified operation; or if the first application is not installed on the first device, the first device obtains the installation package of the first application or the attribute information of the first application from the second device. The first device installs the first application by using the installation package of the first application if the first device obtains the installation package of the first application; or if the first device obtains the attribute information of the first application, the first device searches for (or downloads) the installation package of the first application from the first device or the server based on the attribute information, and installs the first application by using the found installation package of the first application. Through such setting, application sharing between devices can be conveniently implemented in a multi-screen collaborative operation process.

Further, that the first device obtains an installation package of the first application or attribute information of the first application from the second device may include:
  the first device detects whether the installation package that is of the first application and that is obtained from the second device can be installed on the first device; and
  the first device obtains the installation package of the first application from the second device if the first device detects that the installation package that is of the first application and that is obtained from the second device can be installed on the first device; or
  the first device obtains the attribute information of the first application from the second device if the first device detects that the installation package that is of the first application and that is obtained from the second device cannot be installed on the first device.

Before the first device obtains the installation information of the first application, the first device first detects whether the installation package that is of the first application and that is obtained from the second device can be installed on the first device, that is, detects whether the application on the second device can be directly installed on an operating system of the first device, and determines, based on a detection result, that the installation information that is of the first application and that is obtained from the second device is the installation package of the first application or the attribute information of the first application.

Further, before the first device obtains the attribute information of the first application from the second device if the first device detects that the installation package that is of the first application and that is obtained from the second device cannot be installed on the first device, the method may further include:
  the first device detects whether an emulator of the first application is installed on the first device; and
  the first device obtains the attribute information of the first application from the second device if the first device detects that the emulator of the first application is not installed on the first device; or
  if the first device detects that the emulator of the first application is installed on the first device, the first device obtains the installation package of the first application from the second device and runs the obtained installation package of the first application by using the emulator, to install the first application on the emulator.

The emulator may emulate a function of a hardware processor and a program of an instruction system by using software, so that a computer or another multimedia platform (a palmtop computer or a mobile phone) can run software on another platform. If the emulator of the first application is installed on the first device, an application installation package that cannot be installed on a system may be run on the emulator. Therefore, if the first device detects that the emulator of the first application is installed on the first device, the first device may obtain the installation package of the first application from the second device and run the obtained installation package of the first application by using the emulator, to install the first application on the emulator.

Further, that the first device detects whether the installation package that is of the first application and that is obtained from the second device can be installed on the first device may include:
  the first device detects whether an operating system of the first device is the same as an operating system of the second device; and
  if the operating system of the first device is the same as the operating system of the second device, the first device determines that the installation package that is of the first application and that is obtained from the second device can be installed on the first device; or
  if the operating system of the first device is different from the operating system of the second device, the first device determines that the installation package that is of the first application and that is obtained from the second device cannot be installed on the first device.

Usually, if operating systems of two devices are the same, an application installation package on one device is also applicable to the other device. Therefore, whether the operating system of the first device is the same as the operating system of the second device may be detected to determine whether the installation package that is of the first application and that is obtained from the second device can be installed on the first device.

Further, that the first device detects whether the installation package that is of the first application and that is obtained from the second device can be installed on the first device may include:
  the first device extracts a file name extension of the installation package that is of the first application and that is obtained from the second device; and
  the first device determines, based on an operating system of the first device and the file name extension, whether the installation package that is of the first application and that is obtained from the second device can be installed on the first device.

For an operating system, a file name extension of an installation package of an application applicable to the operating system is usually known. For example, a file name extension of an installation package of an application applicable to an Android system is .apk or .gpk, and a file name extension of an installation package of an application applicable to an iOS system is .ipa. Therefore, the first device may extract the file name extension of the installation package of the first application installed on the second device and match the file name extension against the operating system of the first device, to determine whether the installation package that is of the first application and that is obtained from the second device can be installed on the first device.

According to a second aspect, an embodiment may provide an application installation apparatus, used in a first device, where the apparatus includes:
  an operation detection module, configured to obtain installation information of a first application from a second device when detecting a specified operation on the first application in a current display interface, where the first application is an application on a home screen of the second device, and the home screen of the second device is displayed in the current display interface of the first device; and an application installation module, configured to install the first application based on the installation information of the first application.

According to a third aspect, an embodiment may provide a terminal device, including a memory, a processor, and a computer program that is stored in the memory and that can be run on the processor. When executing the computer program, the processor implements steps of the application installation method according to the first aspect.

According to a fourth aspect, an embodiment may provide a non-transitory computer-readable storage medium, where the non-transitory computer-readable storage medium stores a computer program, and when the computer program is executed by a processor, steps of the application installation method according to the first aspect are implemented.

According to a fifth aspect, an embodiment may provide a computer program product. When the computer program product runs on a terminal device, the terminal device is enabled to perform steps of the application installation method according to the first aspect.

For effects that can be implemented in the second aspect to the fifth aspect, refer to the effects in the first aspect. Details are not described herein again.

Compared with the conventional technology, the embodiments may have the following beneficial effects: Application sharing between devices can be implemented in a multi-screen collaborative operation process, operations are simple, and practicability is high.

DETAILED DESCRIPTION OF THE EMBODIMENTS

Figure 1:
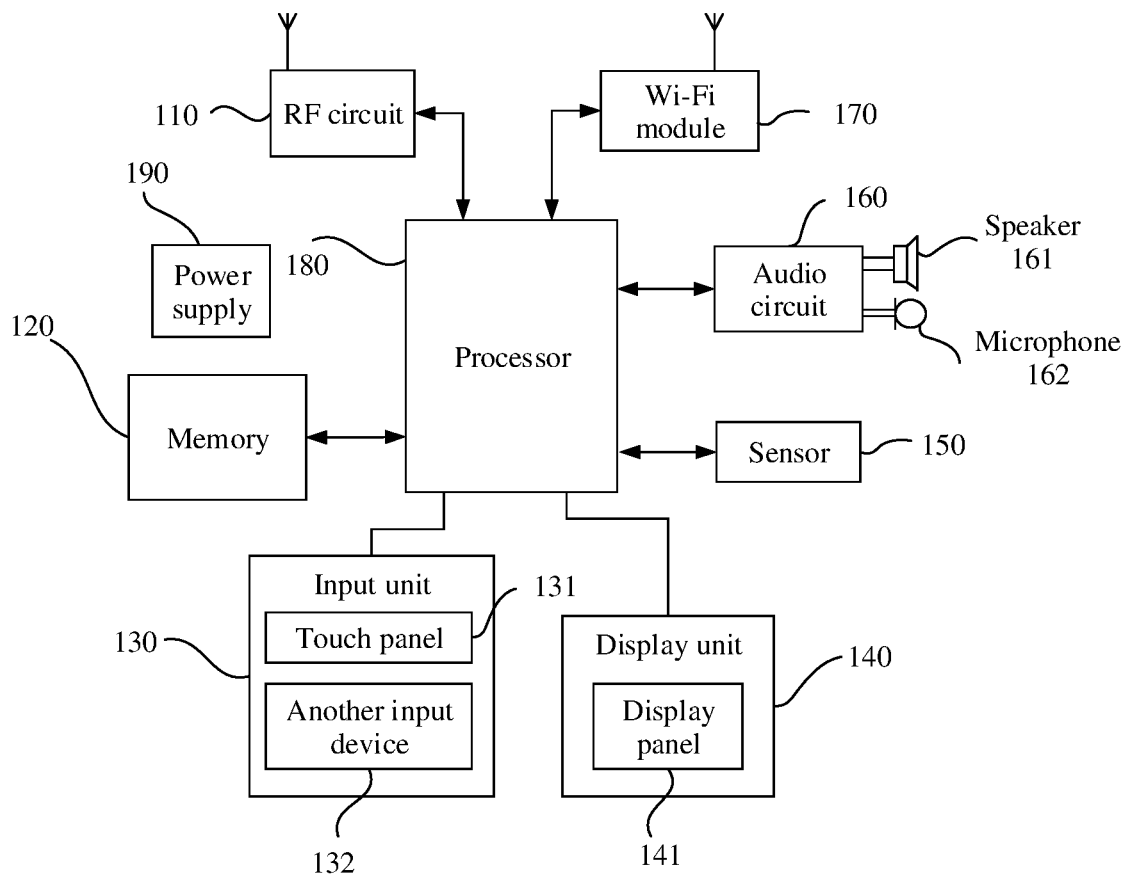
FIG. 1 is a schematic diagram of a hardware structure of a mobile phone to which an application installation method is applicable according to an embodiment.

In the following description, for illustration instead of limitation, details such as a particular apparatus structure and a technology are provided to facilitate a thorough understanding of the embodiments. However, a person skilled in the art should know that other embodiments may have different details. In other cases, detailed descriptions of well-known apparatuses, circuits, and methods are omitted, so that the embodiments described without being obscured by unnecessary details.

Terms used in the following embodiments are merely intended to describe the embodiments, but are not intended to limit them. The terms "one", "a", "the", "the foregoing", "this", and "the one" of singular forms used herein are also intended to include expressions such as "one or more", unless otherwise specified in the context clearly. It should be further understood that, in the embodiments, "one or more" refers to one, two, or more, and the term "and/or" describes an association between associated objects and indicates that three relationships may exist. For example, A and/or B may indicate the following cases: only A exists, both A and B exist, and only B exists, where A and B may be singular or plural. The character "/" usually indicates an "or" relationship between the associated objects.

An application installation method according to the embodiments may be applied to a server or a terminal device such as a mobile phone, a tablet computer, a wearable device, a vehicle-mounted device, an augmented reality (AR)/virtual reality (VR) device, a notebook computer, an ultra-mobile personal computer (UMPC), a netbook, a personal digital assistant (PDA), or a large-screen television. A type of each of the terminal device and the server is not limited in the embodiments.

For example, the terminal device may be a station (ST) in a WLAN, or may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, an Internet of Vehicles terminal, a computer, a laptop computer, a handheld communications device, a handheld computing device, a satellite wireless device, a wireless modem card, a set-top box (STB) of a television, customer premise equipment (CPE) and/or another device for communication over a wireless apparatus, or a next-generation communications apparatus, for example, a mobile terminal in a 5G network, or a mobile terminal in a future evolved public land mobile network (PLMN).

As an example rather than a limitation, when the terminal device is a wearable device, the wearable device may alternatively be a generic term for wearable devices such as glasses, gloves, watches, clothes, and shoes that are developed based on intelligent design of daily wearing by using wearable technologies. The wearable device is a portable device that can be directly worn on the body or integrated into clothes or an accessory of a user. The wearable device is not merely a hardware device but is used to implement a powerful function through software support, data exchange, and cloud interaction. In a broad sense, wearable intelligent devices include full-featured and large-size devices that can implement complete or partial functions without depending on smartphones, such as smart watches or smart glasses, and devices that are dedicated to only one type of application function and need to work with other devices such as smartphones, such as various smart bands or smart jewelry for monitoring physical signs.

For example, the terminal device is a mobile phone. FIG. 1 is a block diagram of a partial structure of a mobile phone according to an embodiment. As shown in FIG. 1, the mobile phone includes components such as a radio frequency (RF) circuit 110, a memory 120, an input unit 130, a display unit 140, a sensor 150, an audio circuit 160, a wireless fidelity (Wi-Fi) module 170, a processor 180, and a power supply 190. A person skilled in the art may understand that the structure of the mobile phone shown in FIG. 1 does not constitute a limitation on the mobile phone. The mobile phone may include more or fewer components than those shown in the figure, or may include a combination of some components, or may have different component arrangements.

The following describes the components of the mobile phone with reference to FIG. 1.

The RF circuit 110 may be configured to receive and send signals during information receiving and sending or during a call; particularly, after receiving downlink information of a base station, send the downlink information to the processor 180 for processing; and send uplink data to the base station. Usually, the RF circuit includes, but is not limited to, an antenna, at least one amplifier, a transceiver, a coupler, a low noise amplifier (LNA), a duplexer, and the like. In addition, the RF circuit 110 may further communicate with a network and another device through wireless communication. The wireless communication may use any communications standard or protocol, including, but not limited to, a global system for mobile communications (GSM), a general packet radio service (GPRS), code division multiple access (CDMA), wideband code division multiple access (WCDMA), long term evolution (LTE), an email, a short message service (SMS), or the like.

The memory 120 may be configured to store a software program and a module. The processor 180 performs various function applications of the mobile phone and data processing by running the software program and the module that are stored in the memory 120. The memory 120 may include a program storage area and a data storage area. The program storage area may store an operating apparatus, an application required by at least one function (such as a sound play function and an image play function), and the like. The data storage area may store data (such as audio data and a phone book) created based on use of the mobile phone, and the like. In addition, the memory 120 may include a high-speed random access memory or may include a nonvolatile memory such as at least one magnetic disk storage device, a flash memory, or another volatile solid-state storage device.

The input unit 130 may be configured to receive entered digital or character information and generate key signal input related to a user setting and function control of the mobile phone. The input unit 130 may include a touch panel 131 and another input device 132. The touch panel 131, also referred to as a touchscreen, may collect a touch operation of the user on or near the touch panel 131 (such as an operation of the user on or near the touch panel 131 by using any suitable object or accessory such as a finger or a stylus), and drive a corresponding connection apparatus according to a preset program. Optionally, the touch panel 131 may include two parts: a touch detection apparatus and a touch controller. The touch detection apparatus detects a touch location of the user, detects a signal brought by a touch operation, and delivers the signal to the touch controller. The touch controller receives touch information from the touch detection apparatus, converts the touch information into touch point coordinates, sends the touch point coordinates to the processor 180, and receives and executes a command sent by the processor 180. In addition, the touch panel 131 may be implemented in a plurality of types, such as a resistive type, a capacitive type, an infrared type, and a surface acoustic wave type. In addition to the touch panel 131, the input unit 130 may further include the another input device 132. The another input device 132 may include, but is not limited to, one or more of a physical keyboard, a functional key (such as a volume control key or an on/off key), a trackball, a mouse, or a joystick.

The display unit 140 may be configured to display information entered by the user or information provided for the user, and various menus of the mobile phone. The display unit 140 may include a display panel 141. Optionally, the display panel 141 may be configured in a form of a liquid crystal display (LCD), an organic light-emitting diode (OLED), or the like. Further, the touch panel 131 may cover the display panel 141. After detecting a touch operation on or near the touch panel 131, the touch panel 131 transfers the touch operation to the processor 180, to determine a type of a touch event. Subsequently, the processor 180 provides a corresponding visual output on the display panel 141 based on the type of the touch event. In FIG. 1, the touch panel 131 and the display panel 141 serve as two independent components to implement input and input functions of the mobile phone. However, in some embodiments, the touch panel 131 and the display panel 141 may be integrated to implement the input and output functions of the mobile phone.

The mobile phone may further include at least one sensor 150, for example, an optical sensor, a motion sensor, and another sensor. The optical sensor may include an ambient light sensor and a proximity sensor. The ambient light sensor may adjust luminance of the display panel 141 based on brightness of ambient light. The proximity sensor may power off the display panel 141 and/or backlight when the mobile phone moves to an ear. As one type of the motion sensor, an accelerometer sensor may detect acceleration values in various directions (usually on three axes). The accelerometer sensor may detect a value and a direction of gravity when the accelerometer sensor is stationary and may be applied to an application for recognizing a mobile phone posture (such as switching between a landscape mode and a portrait mode, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone. Details are not described herein.

The audio circuit 160, a speaker 161, and a microphone 162 may provide an audio interface between the user and the mobile phone. The audio circuit 160 may convert received audio data into an electrical signal, and then transmit the electrical signal to the speaker 161, and the speaker 161 converts the electrical signal into a sound signal for output. In addition, the microphone 162 converts a collected sound signal into an electrical signal. The audio circuit 160 receives the electrical signal, converts the electrical signal into audio data, and then outputs the audio data to the processor 180 for processing. After the processing, the processor 180 sends the audio data to, for example, another mobile phone by using the RF circuit 110, or outputs the audio data to the memory 120 for further processing.

Wi-Fi is a short-distance radio transmission technology. The mobile phone can help, by using the Wi-Fi module 170, the user to receive and send emails, browse a web page, access streaming media, and the like, to provide wireless broadband internet access for the user. Although FIG. 1 shows the Wi-Fi module 170, it can be understood that the Wi-Fi module 170 is not a necessary component of the mobile phone, and when required, the Wi-Fi module 170 can be omitted.

The processor 180 is a control center of the mobile phone and connected to all parts of the entire mobile phone through various interfaces and lines and performs various functions of the mobile phone and data processing by running or executing the software program and/or the module stored in the memory 120 and invoking data stored in the memory 120, to perform overall monitoring on the mobile phone. Optionally, the processor 180 may include one or more processing units. An application processor and a modem processor may be integrated into the processor 180. The application processor may process an operating apparatus, a user interface, an application, and the like. The modem processor may process wireless communication. It may be understood that the modem processor may not be integrated into the processor 180.

The mobile phone further includes the power supply 190 (such as a battery) that supplies power to each component. The power supply may be logically connected to the processor 180 by using a power management apparatus, to implement functions such as charging management, discharging management, and power consumption management by using the power management apparatus.

Although not shown in the figure, the mobile phone may further include cameras, including at least one conventional RGB camera and at least one infrared camera or hyperspectral camera. Optionally, the camera on the mobile phone may be front-facing or rear-facing. This is not limited in this embodiment.

Optionally, the mobile phone may include a single camera, two cameras, three cameras, or the like. This is not limited in this embodiment.

For example, the mobile phone may include three cameras, where one is a primary camera, one is a wide-angle camera, and one is a long-focus camera.

Optionally, when the mobile phone includes a plurality of cameras, the plurality of cameras may be all front-facing, or all rear-facing, or partially front-facing and partially rear-facing. This is not limited in this embodiment.

In addition, although not shown in the figure, the mobile phone may further include a Bluetooth module and the like. Details are not described herein.

Figure 2:
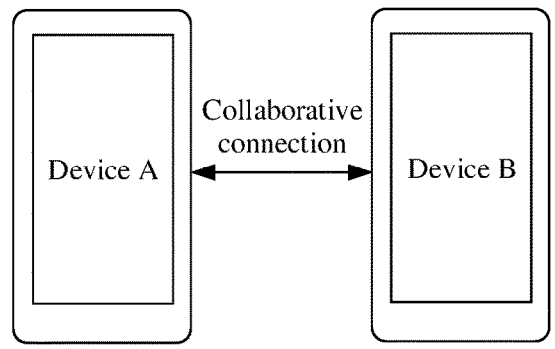
FIG. 2 is a schematic diagram of a multi-screen collaborative operating system to which an application installation method is applicable according to an embodiment.

FIG. 2 is a schematic diagram of a multi-screen collaborative operating system to which an application installation method is applicable according to an embodiment. The system includes a device A and a device B. Both the device A and the device B may be various types of terminal devices, such as a mobile phone, a tablet, a PC, and a large-screen television. That is, the embodiments may be applicable to various different application scenarios such as a collaborative operation between a mobile phone and a tablet, a collaborative operation between a mobile phone and a large-screen television, a collaborative operation between a mobile phone and another mobile phone, a collaborative operation between a mobile phone and a PC, a collaborative operation between a PC and a tablet, a collaborative operation between a PC and a large-screen television, and a collaborative operation between a tablet and another tablet.

A multi-screen collaborative operation is a distributed technology that can implement cross-system and cross-device collaboration. After the device A is connected to the device B, resource sharing and collaborative operations between the two devices can be implemented.

The device A and the device B may be connected in various wired or wireless manners, for example, by using a communications data cable, Bluetooth, NFC, or Wi-Fi. This is not limited. For example, the device A and the device B may be connected by using a "OneHop" function. Both the device A and the device B enable an NFC function, and after NFC areas of the two devices are in contact and user confirmation is performed, the connection may be completed. For another example, the device A and the device B enable Wi-Fi and Bluetooth. A user taps "Proximity connection" on the device A, and then places the device B close to the device A. Then the user taps "Connect" on the device B and taps "OK" on the device A to complete the connection. In addition, the device A and the device B may alternatively use another connection manner such as "Scan to Connect".

After the device A and the device B are connected, functions such as screen-sharing display, hardware device sharing, and quick file transfer can be implemented. For example, a screen window of the device B may be displayed in a display interface of the device A; the device B may be controlled by using an input device of the device A; and a file on the device A may be dragged from the display interface of the device A to the screen window of the device B, so that the file on the device A may be transferred to the device B.

The application installation method may be applied to the multi-screen collaborative operating system, so that application sharing between the device A and the device B can be conveniently implemented.

It should be noted that FIG. 2 shows only a case in which two devices perform a multi-screen collaborative operation. However, the embodiments may not limit a quantity of devices for the collaborative operation. In other words, the application installation method may also be applied to a system in which three or more devices perform a multi-screen collaborative operation. For example, a device A, a device B, and a device C are connected, and screen windows of both the device B and the device C are displayed on the device A. According to the application installation method, application sharing among the device A, the device B, and the device C can be conveniently implemented. The same rule applies to other scenarios.

Figure 3:
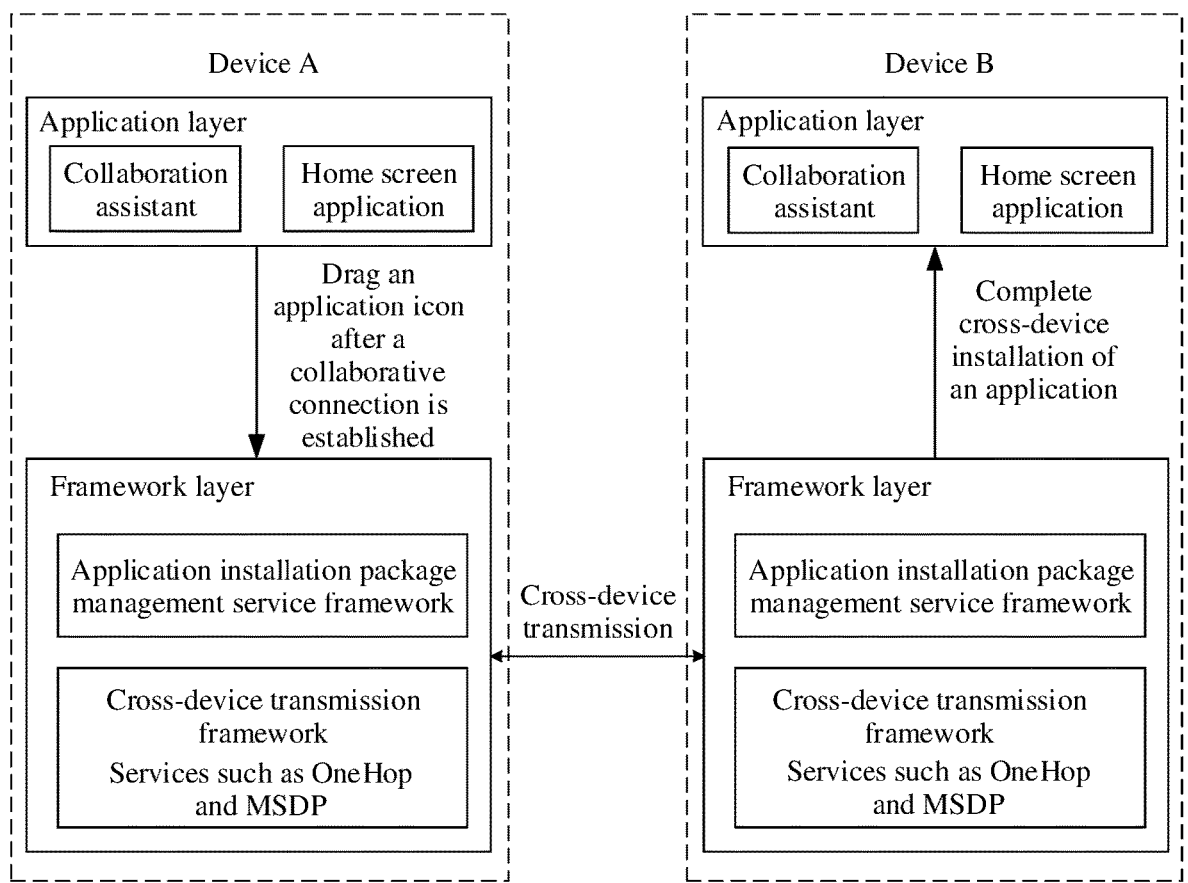
FIG. 3 is a diagram of a software architecture of the multi-screen collaborative operating system shown in FIG. 2.

FIG. 3 is a diagram of a software architecture of the multi-screen collaborative operating system shown in FIG. 2.

In FIG. 3, application layers of both the device A and the device B include function modules such as a collaboration assistant and a home screen application, and framework layers of both the device A and the device B include an application installation package management service framework and a cross-device transmission framework.

When a collaborative connection is to be established between the device A and the device B, the collaboration assistant at the application layer starts services such as OneHop and MSDP at the framework layer to establish the connection between device A and device B. OneHop is a multi-terminal service collaboration solution. Based on the NFC short-range communication protocol, the multi-device touch interaction capability is enabled to terminal applications and third-party devices, so that different devices are connected. MSDP, short for Multicast Source Discovery Protocol, is a multicast routing protocol of an independent multicast protocol family. MSDP interconnects a plurality of IPv4 PIM sparse mode (PIM-SM) domains to provide rendezvous point (RP) redundancy and inter-domain multicast for a PIM-SM.

When an event of dragging an application icon from a window area of the device A to a window area of the device B is detected in the display interface of the device A, a home screen application on the device A transmits information such as the event and an installation package of the related application to the device B through the framework layer. After receiving the event and the installation package, the framework layer of the device B triggers the application layer to complete cross-device installation of the application.

When an event of dragging an application icon from the window area of the device B to the window area of the device A is detected in the display interface of the device A, a home screen application on the device B transmits information such as an installation package of the related application to the device A through the framework layer. After receiving the event and the installation package, the framework layer of the device A triggers the application layer to complete cross-device installation of the application.

Figure 4:
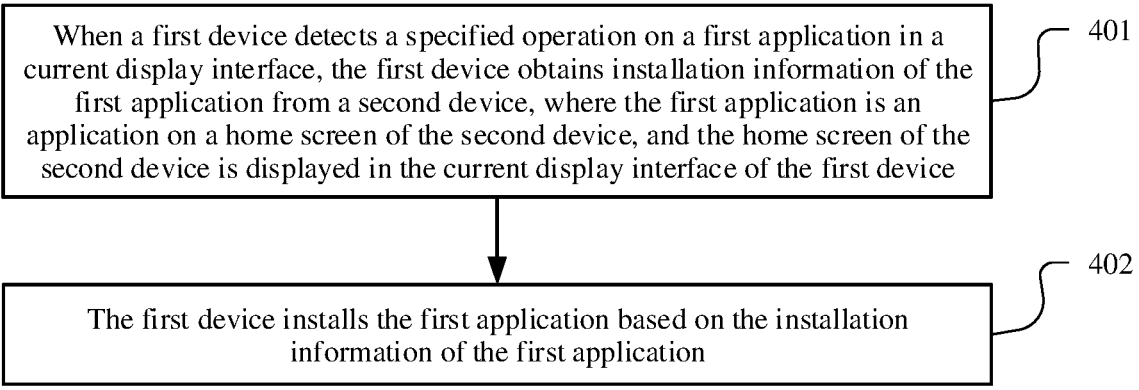
FIG. 4 is a flowchart of an application installation method according to an embodiment.

FIG. 4 is a flowchart of an application installation method according to an embodiment. The method includes the following steps.

401: A first device obtains installation information of a first application from a second device when the first device detects a specified operation on the first application in a current display interface, where the first application is an application on a home screen of the second device, and the home screen of the second device is displayed in the current display interface of the first device.

The first device and the second device may be terminal devices of any type, for example, a mobile phone, a tablet, a PC, and a large-screen television. The first device and the second device are connected and are currently in a multi-screen collaborative operation state. A screen window of the second device is displayed in the display interface of the first device. For more descriptions of multi-screen collaboration, refer to the foregoing related content. The first device may be considered as the device A (or the device B) in FIG. 2, and correspondingly, the second device may be considered as the device B (or the device A) in FIG. 2.

When the home screen of the second device is displayed in the current display interface of the first device, if a user wants to install an application X of the second device on the first device, the user only needs to perform, in the current display interface of the first device, a specified operation on the application X on the home screen of the second device, for example, tap or drag an icon of the application X. After detecting the specified operation, the first device sends a data obtaining instruction to the second device, to obtain installation information of the application X from the second device, where the installation information may include information such as an application installation package, an application name, an application type, application developer information, or a download link of the application.

The specified operation on the first application in the current display interface may include:

an operation of dragging an icon of the first application in the current display interface to a target area, where the target area is an area in the current display interface of the first device other than an area in which the home screen of the second device is located.

Because the home screen of the second device is displayed in the current display interface of the first device, the user may conveniently perform the operation in the current display interface of the first device to drag the application icon on the home screen of the second device to the area in the current display interface of the first device other than the home screen of the second device. This operation is equivalent to triggering the first device to install the application corresponding to the application icon on the second device.

402: The first device installs the first application based on the installation information of the first application.

After receiving the installation information that is of the first application and that is sent by the second device, the first device automatically installs the first application based on the installation information. In this way, the application of the second device is shared with the first device.

Further, the application installation method may further include:

when the first device detects an operation of dragging an icon of a second application in the target area to the area in which the home screen of the second device is located, the first device sends installation information of the second application to the second device, to indicate the second device to install the second application based on the installation information of the second application.

In addition, the user may further perform the operation in the current display interface of the first device to drag the application icon in the area (which is usually a home screen of the first device) in the current display interface of the first device other than the home screen of the second device to the area in which the home screen of the second device is located. This operation is equivalent to triggering the second device to install the application corresponding to the application icon on the first device. After detecting the operation, the first device sends the installation information of the corresponding application to the second device. After receiving the installation information, the second device automatically completes installation of the corresponding application. In this way, the application of the first device is shared with the second device.

In a process of performing a multi-screen collaborative operation on the first device and the second device, the screen window of the second device is displayed in the display interface of the first device. When the home screen of the second device is displayed in the display interface of the first device, if a user wants to experience, on the first device, an application installed on the second device, the user only needs to perform, in the display interface of the first device, a specified operation on the related application on the home screen of the second device, for example, tapping or dragging an icon of the related application on the home screen of the second device. Then, the first device obtains installation information of the application from the second device, and automatically completes installation of the application based on the installation information. It can be understood that, in the application installation method according to this embodiment, application sharing between devices can be conveniently implemented in a multi-screen collaborative operation process.

Figure 5:
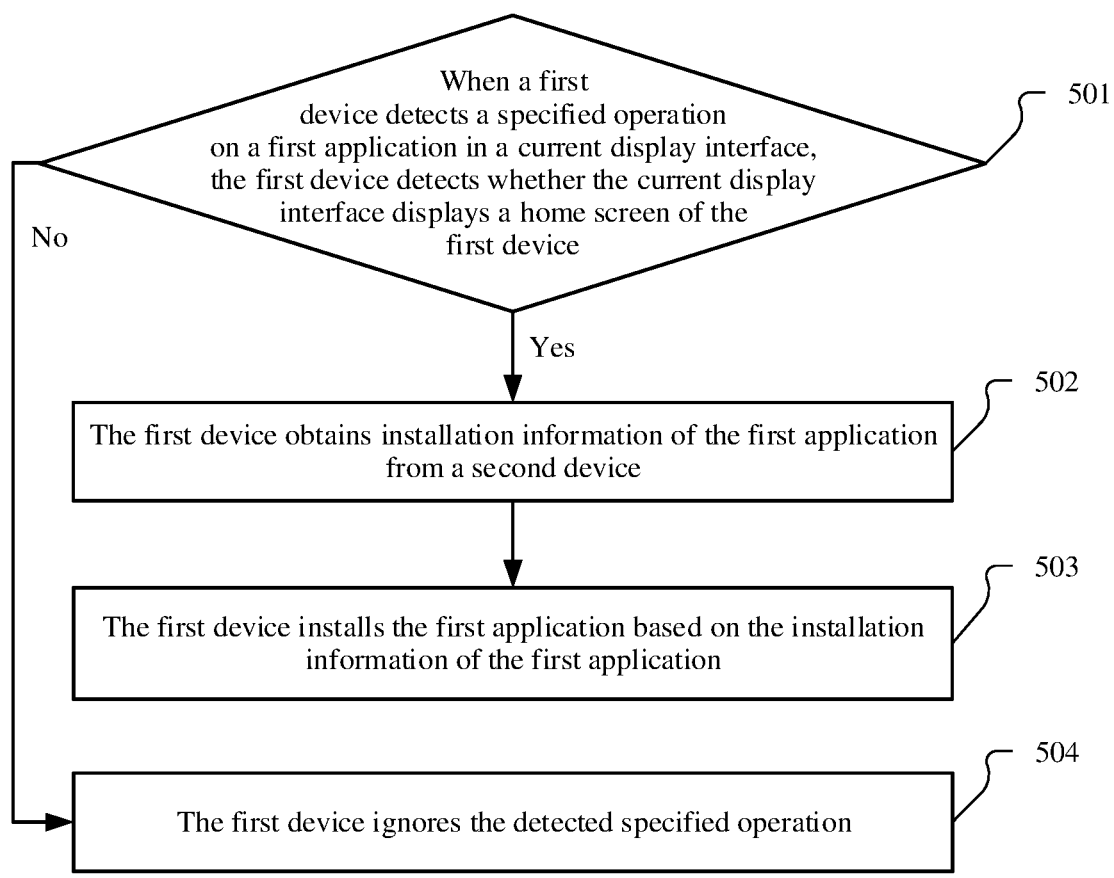
FIG. 5 is a flowchart of another application installation method according to an embodiment.

FIG. 5 is a flowchart of another application installation method according to an embodiment. The method includes the following steps.

501: When a first device detects a specified operation on a first application in a current display interface, the first device detects whether the current display interface displays a home screen of the first device.

Same as those in the foregoing embodiment, the first device and a second device are connected, and are currently in a multi-screen collaborative operation state, the first application is an application on a home screen of the second device, and the home screen of the second device is displayed in the current display interface of the first device.

When detecting the specified operation on the first application in the current display interface, the first device first detects whether the current display interface displays the home screen of the first device. The first device may detect, by obtaining window data, whether the current display interface displays the home screen of the first device. If the current display interface displays the home screen of the first device, steps 502 and 503 are performed; or if the current display interface does not display the home screen of the first device, step 504 is directly performed.

502: The first device obtains installation information of the first application from the second device.

503: The first device installs the first application based on the installation information of the first application.

If the current display interface displays the home screen of the first device, and the operation is determined to be an operation of triggering the first device to install the first application, the first device obtains the installation information of the first application from the second device, and then automatically completes installation of the first application based on the installation information.

504: The first device ignores the detected specified operation.

If the current display interface does not display the home screen of the first device, for example, an interface of a running application is currently displayed, to avoid disturbing an operation performed by the user in the interface of the application on the first device, and improve flexibility and practicability of an operation of installing an application, the specified operation may be considered to be an action triggered by mistake and may be ignored, that is, the operation of installing the first application by the first device is not triggered.

In this embodiment, when detecting the specified operation on the first application in the current display interface, the first device first detects whether the current display interface displays the home screen of the first device. If the current display interface displays the home screen of the first device, the operation of installing the first application by the first device is triggered. In this case, the first device obtains the installation information of the first application from the second device, and then automatically completes installation of the first application based on the installation information. If the current display interface does not display the home screen of the first device, the detected specified operation is ignored, and the operation of installing the first application by the first device is not triggered. Through such setting, flexibility and practicability of an operation of sharing an application between devices on which a multi-screen collaborative operation is performed can be further improved.

Figure 6:
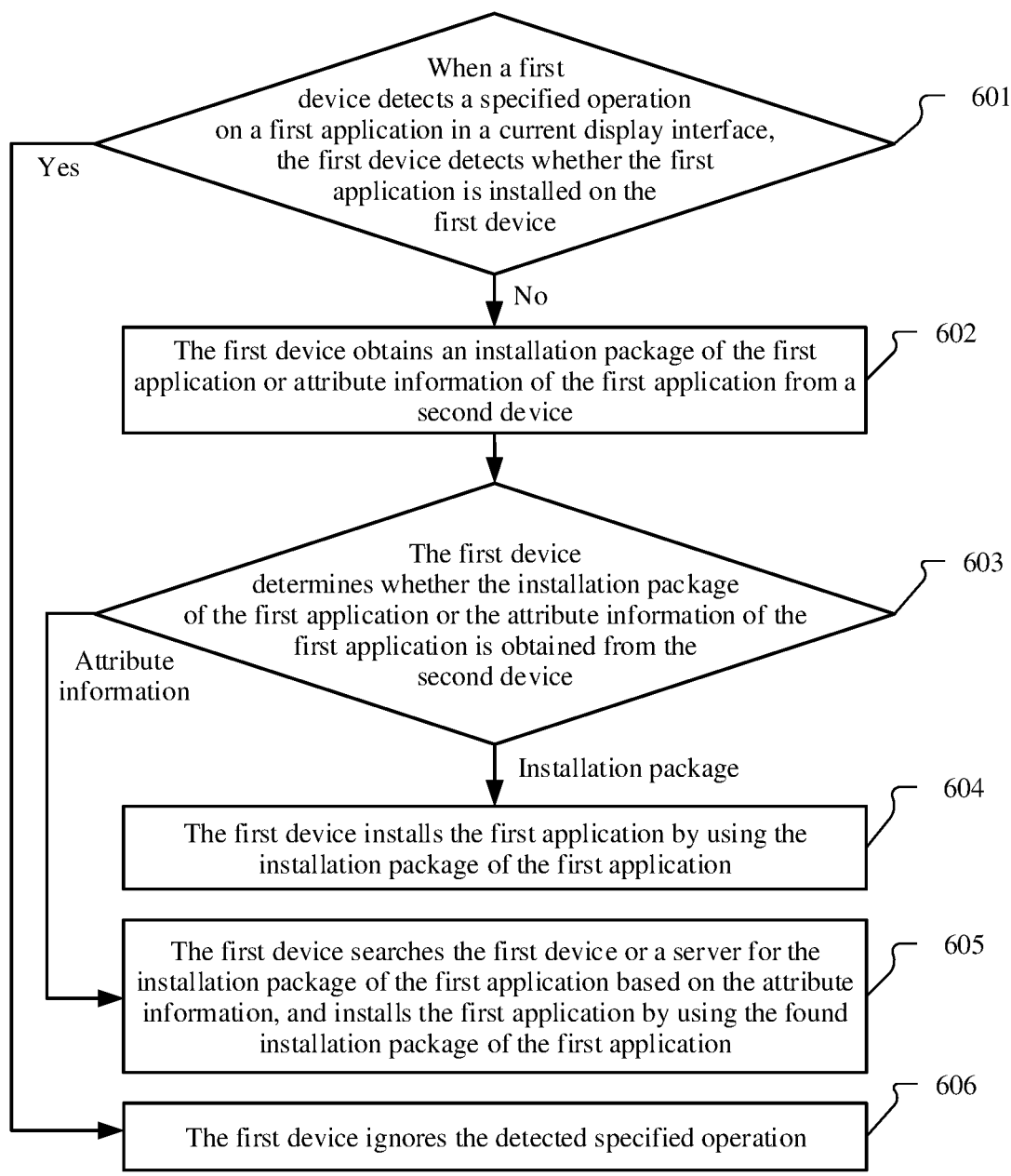
FIG. 6 is a flowchart of another application installation method according to an embodiment.

FIG. 6 is a flowchart of another application installation method according to an embodiment. The method includes the following steps.

601: When a first device detects a specified operation on a first application in a current display interface, the first device detects whether the first application is installed on the first device.

Same as those in the foregoing embodiment, the first device and a second device are connected, and are currently in a multi-screen collaborative operation state, the first application is an application on a home screen of the second device, and the home screen of the second device is displayed in the current display interface of the first device.

When detecting the specified operation on the first application in the current display interface, the first device first detects whether the first application is installed on the first device. If the first application is installed on the first device, the first application does not need to be repeatedly installed by using the second device, and in this case, step 606 is directly performed. If the first application is not installed on the first device, the specified operation is an operation of triggering the first device to install the first application, and in this case, steps 602 to 605 are performed.

602: The first device obtains an installation package of the first application or attribute information of the first application from the second device.

After triggering the operation of installing the first application on the first device, the first device may send a data obtaining instruction to the second device. After receiving the data obtaining instruction, the second device returns the installation package or the attribute information of the first application. The attribute information may include information such as an application name, an application type, application developer information, or a download link of the application.

Figure 7:
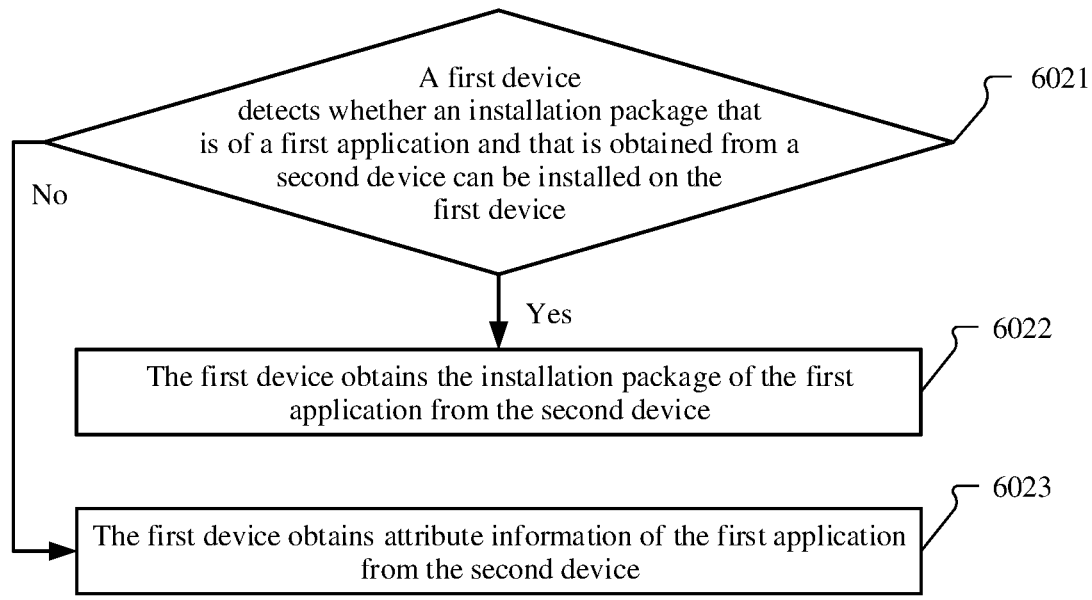
FIG. 7 is a flowchart of an implementation of step 602 in FIG. 6.

Further, as shown in FIG. 7, step 602 may include the following steps.

6021: The first device detects whether the installation package that is of the first application and that is obtained from the second device can be installed on the first device.

Before the first device obtains the installation information of the first application, the first device first detects whether the installation package that is of the first application and that is obtained from the second device can be installed on the first device, that is, detects whether the application on the second device can be directly installed on an operating system of the first device, and determines, based on a detection result, that the installation information that is of the first application and that is obtained from the second device is the installation package of the first application or the attribute information of the first application.

Optionally, step 6021 may include:
(1) if the operating system of the first device is the same as an operating system of the second device, the first device determines that the installation package that is of the first application and that is obtained from the second device can be installed on the first device; or
(2) if the operating system of the first device is different from an operating system of the second device, the first device determines that the installation package that is of the first application and that is obtained from the second device cannot be installed on the first device.

Usually, if operating systems of two devices are the same, an application installation package on one device is also applicable to the other device. Therefore, whether the operating system of the first device is the same as the operating system of the second device may be detected to determine whether the installation package that is of the first application and that is obtained from the second device can be installed on the first device. For example, if both the device A and the device B are devices running an Android system, application installation packages on the device A and the device B can be shared. If the device A is a device running an Android system, and the device B is a device running an iOS system, an application installation package on the device A cannot be directly used by the device B, and similarly, an application installation package on the device B cannot be directly used by the device A.

Optionally, step 6021 may include:
(1) the first device extracts a file name extension of the installation package that is of the first application and that is obtained from the second device; and
(2) the first device determines, based on the operating system of the first device and the file name extension, whether the installation package that is of the first application and that is obtained from the second device can be installed on the first device.

For an operating system, a file name extension of an installation package of an application applicable to the operating system is usually known. For example, a file name extension of an installation package of an application applicable to an Android system is .apk or .gpk, and a file name extension of an installation package of an application applicable to an iOS system is .ipa. Therefore, the first device may extract the file name extension of the installation package of the first application installed on the second device and match the file name extension against the operating system of the first device, to determine whether the installation package that is of the first application and that is obtained from the second device can be installed on the first device.

If the first device detects that the installation package that is of the first application and that is obtained from the second device can be installed on the first device, step 6022 is performed; or if the first device detects that the installation package that is of the first application and that is obtained from the second device cannot be installed on the first device, step 6023 is performed.

Further, if the first device detects that the installation package that is of the first application and that is obtained from the second device cannot be installed on the first device, before step 6023 is performed, the method may further include:
(1) the first device detects whether an emulator of the first application is installed on the first device; and
(2) the first device obtains the attribute information of the first application from the second device if the first device detects that the emulator of the first application is not installed on the first device; or
(3) if the first device detects that the emulator of the first application is installed on the first device, the first device obtains the installation package of the first application from the second device and runs the obtained installation package of the first application by using the emulator, to install the first application on the emulator.

The emulator may emulate a function of a hardware processor and a program of an instruction system by using software, so that a computer or another multimedia platform (a palmtop computer or a mobile phone) can run software on another platform. If the emulator of the first application is installed on the first device, an application installation package that cannot be installed on a system may be run on the emulator. Therefore, if the first device detects that the emulator of the first application is installed on the first device, the first device may obtain the installation package of the first application from the second device and run the obtained installation package of the first application by using the emulator, to install the first application on the emulator. Common emulators include an LDPlayer Android emulator, an MEmu Android emulator, a NoxPlayer emulator, and the like. An operation method of installing an application on an emulator usually includes: running the emulator and tapping an application installation package, so that the emulator can automatically install the corresponding application. Alternatively, the application installation package may be dragged to the emulator to install the corresponding application on the emulator. If the emulator of the first application is not installed on the first device, step 6023 is performed.

6022: The first device obtains the installation package of the first application from the second device.

If the first device detects that the installation package that is of the first application and that is obtained from the second device can be installed on the first device, the first device obtains the installation package of the first application from the second device.

6023: The first device obtains the attribute information of the first application from the second device.

If the first device detects that the installation package that is of the first application and that is obtained from the second device cannot be installed on the first device (and the emulator of the first application is not installed on the first device), the first device obtains the attribute information of the first application from the second device.

603: The first device determines whether the installation package of the first application or the attribute information of the first application is obtained from the second device.

After obtaining the installation package of the first application or the attribute information of the first application from the second device, the first device determines whether the installation package of the first application or the attribute information of the first application is obtained. If the installation package of the first application is obtained from the second device, step 604 is performed; or if the attribute information of the first application is obtained from the second device, step 605 is performed.

604: The first device installs the first application by using the installation package of the first application.

The first device obtains the installation package of the first application from the second device, and in this case, the first application is directly installed by using the installation package.

605: The first device searches the first device or a server for the installation package of the first application based on the attribute information and installs the first application by using the found installation package of the first application.

The first device obtains the attribute information of the first application from the second device. In this case, the first device needs to search the first device or the server for the installation package of the first application based on the attribute information and install the first application by using the found installation package of the first application. For example, if the first device obtains a name of the first application, the first device may search for and download, from AppGallery by using the name, the installation package that is of the first application and that is applicable to the operating system of the first device, and finally complete installation of the first application by using the downloaded installation package.

606: The first device ignores the detected specified operation.

If the first application is installed on the first device, the first application does not need to be repeatedly installed by using the second device. In this case, the detected specified operation may be ignored, and specified prompt information is output, for example, information indicating that the related application is installed on the device and can be directly used.

In this embodiment, when the first device detects the specified operation on the first application in the current display interface, the first device first detects whether the first application is installed on the first device. If the first application is installed on the first device, the first device ignores the detected specified operation; or if the first application is not installed on the first device, the first device obtains the installation package of the first application or the attribute information of the first application from the second device. The first device installs the first application by using the installation package of the first application if the first device obtains the installation package of the first application; or if the first device obtains the attribute information of the first application, the first device searches for the installation package of the first application from the first device or the server based on the attribute information, and installs the first application by using the found installation package of the first application. Through such setting, application sharing between devices can be conveniently implemented in a multi-screen collaborative operation process.

Figure 8:
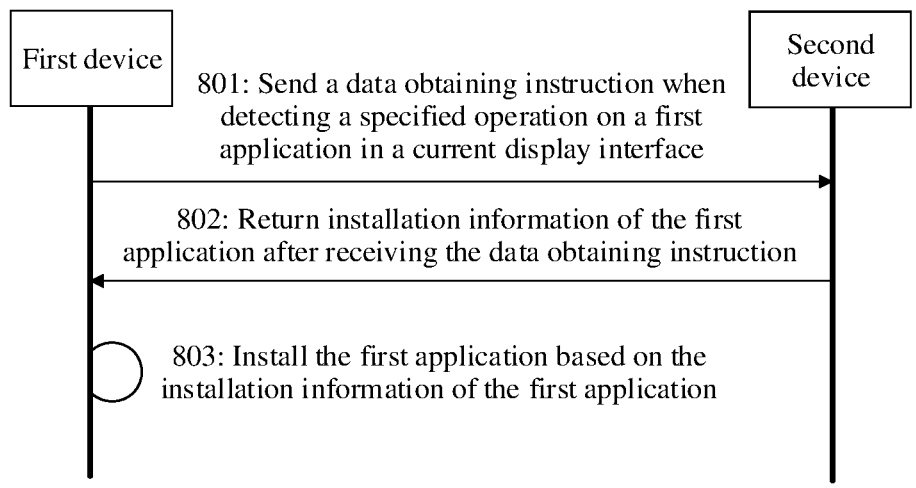
FIG. 8 is an interactive flowchart of an application installation method according to an embodiment.

FIG. 8 is an interactive flowchart of an application installation method according to an embodiment. The method includes the following steps.

801: When a first device detects a specified operation on a first application in a current display interface, the first device sends a data obtaining instruction to a second device.

Both the first device and the second device may be terminal devices of any type, for example, a mobile phone, a tablet, a PC, and a large-screen television. The first device and the second device are connected and are currently in a multi-screen collaborative operation state. A screen window of the second device is displayed in the display interface of the first device.

When the first device detects the specified operation on the first application in the current display interface, the first device sends the data obtaining instruction to the second device, where the first application is an application on a home screen of the second device, and the home screen of the second device is displayed in the current display interface of the first device.

802: After receiving the data obtaining instruction, the second device returns installation information of the first application to the first device.

After receiving the data obtaining instruction, the second device returns the installation information of the first application to the first device, where the installation information may include information such as an application installation package, an application name, an application type, application developer information, or a download link of the application.

803: The first device installs the first application based on the installation information of the first application.

After receiving the installation information that is of the first application and that is sent by the second device, the first device installs the first application based on the installation information of the first application.

In a process of performing a multi-screen collaborative operation on the first device and the second device, the screen window of the second device is displayed in the display interface of the first device. When the home screen of the second device is displayed in the display interface of the first device, if a user wants to experience, on the first device, an application installed on the second device, the user only needs to perform, in the display interface of the first device, a specified operation on the related application on the home screen of the second device, for example, tapping or dragging an icon of the related application on the home screen of the second device. Then, the first device obtains installation information of the application from the second device, and automatically completes installation of the application based on the installation information.

It should be understood that sequence numbers of the steps do not mean execution sequences in the foregoing embodiments. The execution sequences of the processes should be determined based on functions and internal logic of the processes and should not be construed as any limitation on the implementation processes of embodiments.

For ease of understanding, the following describes, by using several actual application scenarios, the application installation method provided in this application.

Figure 9:
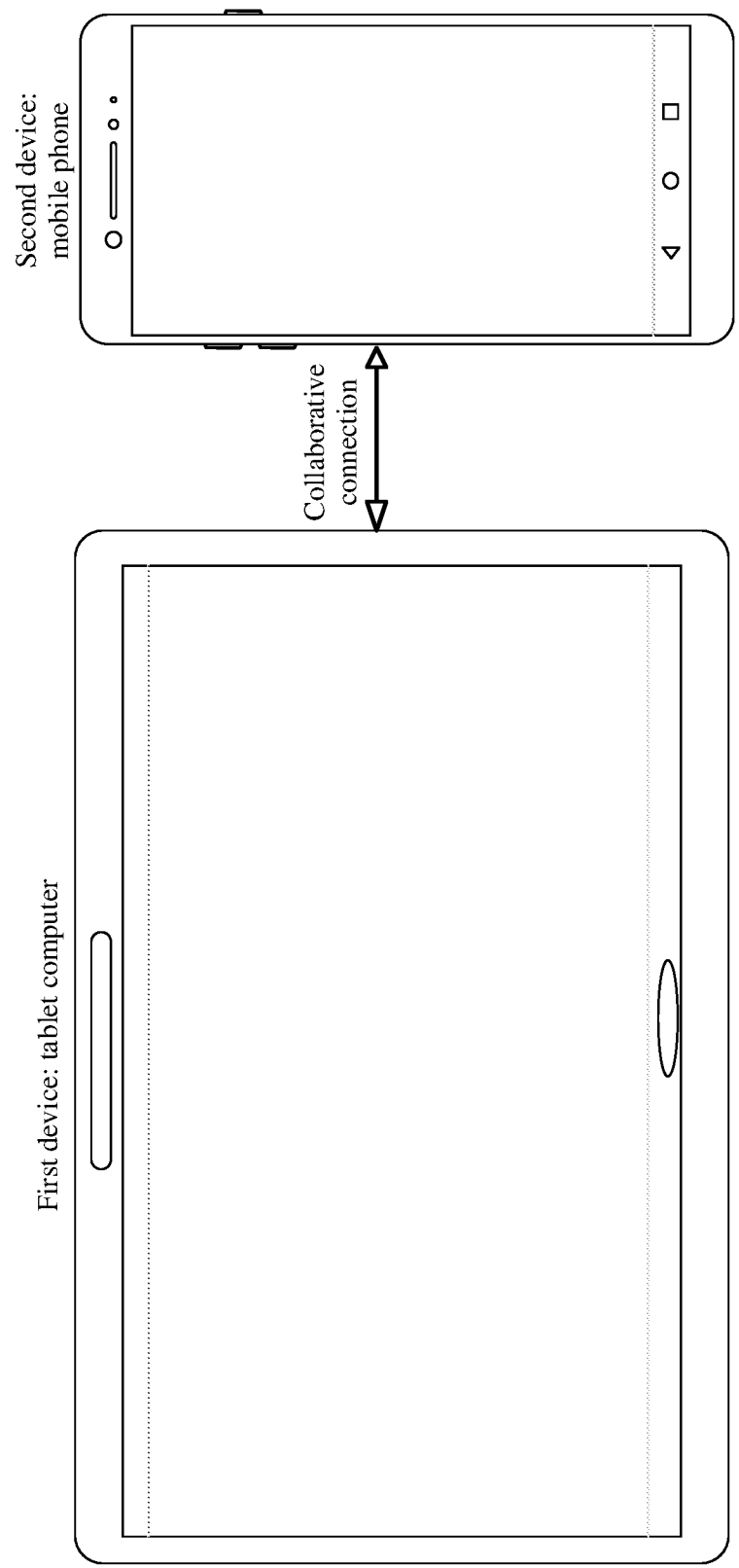
FIG. 9 is a schematic diagram of a system to which an application installation method is applied in an actual scenario according to an embodiment.

FIG. 9 is a schematic diagram of a system to which an application installation method is applied in an actual scenario according to an embodiment.

In FIG. 9, a first device is a tablet computer, a second device is a mobile phone, and the mobile phone and the tablet computer may be connected by using Bluetooth, a data cable, NFC, Wi-Fi, or the like.

Figure 10:
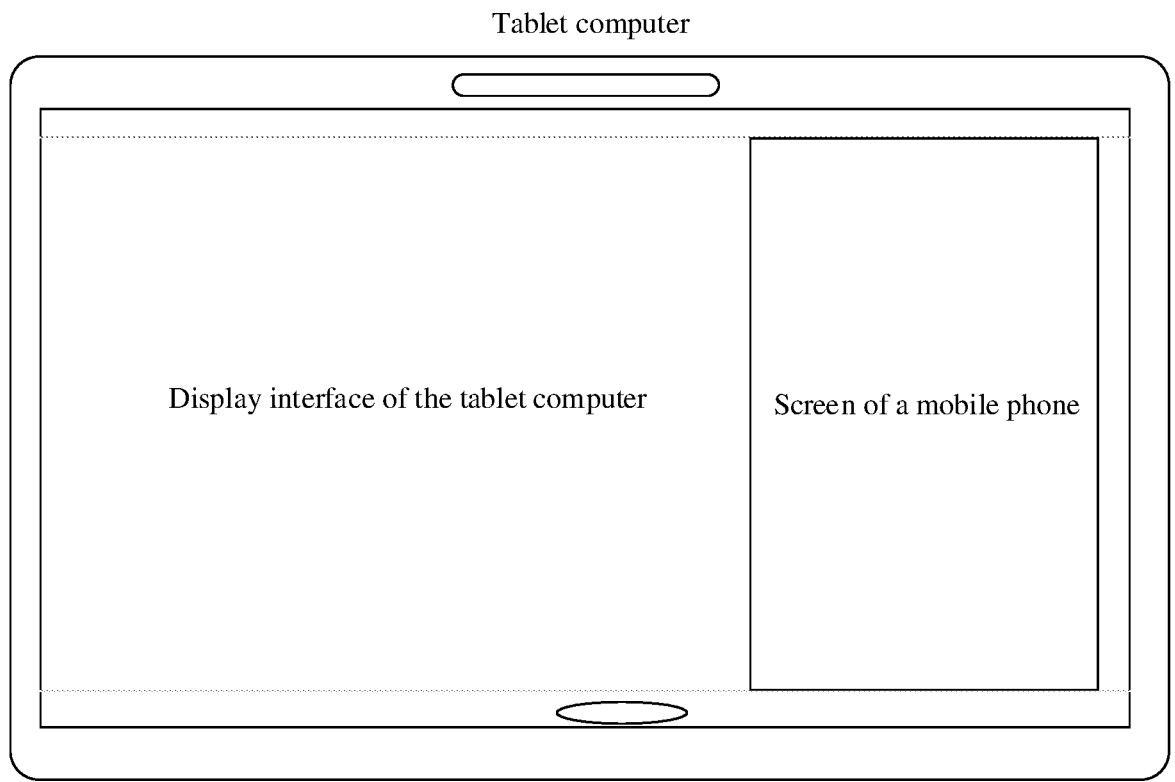
FIG. 10 is a schematic diagram of a display interface of a tablet computer in FIG. 9.

After a collaborative operation connection is established between the tablet computer and the mobile phone, a screen of the mobile phone is displayed in a display interface of the tablet computer. FIG. 10 is a schematic diagram of the display interface of the tablet computer.

Figure 11:
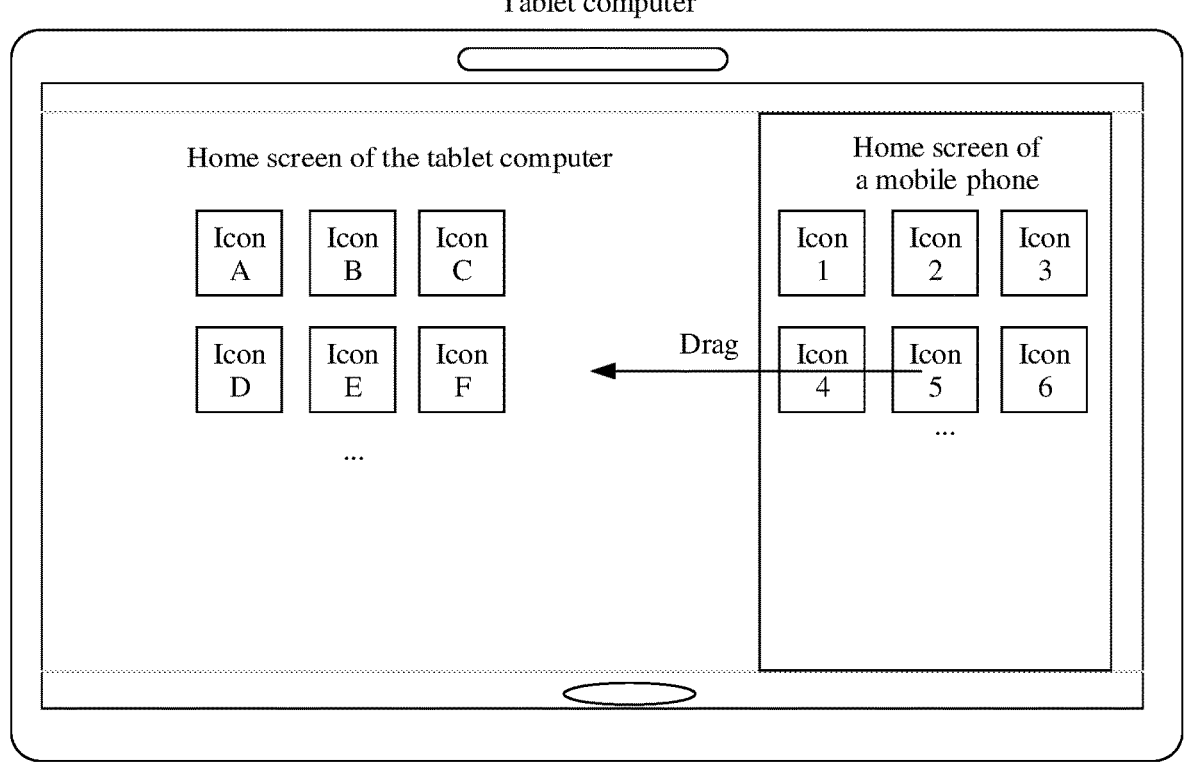
FIG. 11 is a schematic diagram of an operation of installing an application of a mobile phone on a tablet computer in the system shown in FIG. 9.

As shown in FIG. 11, if a user wants to install an application 5 of the mobile phone on the tablet computer, the user may tap, in the display interface of the tablet computer, an icon (Icon 5) of the application 5 on a home screen of the mobile phone, and drag the icon leftward to a home screen area of the tablet computer (FIG. 11 shows only a case in which the icon is dragged leftward, and actually, the icon may alternatively be dragged in another direction). After detecting an operation of the user, the tablet computer obtains installation information of the application 5 by using the mobile phone, and automatically complete installation of the application 5 based on the obtained installation information, so that the application on the mobile phone is conveniently shared with the tablet computer.

Figure 12:
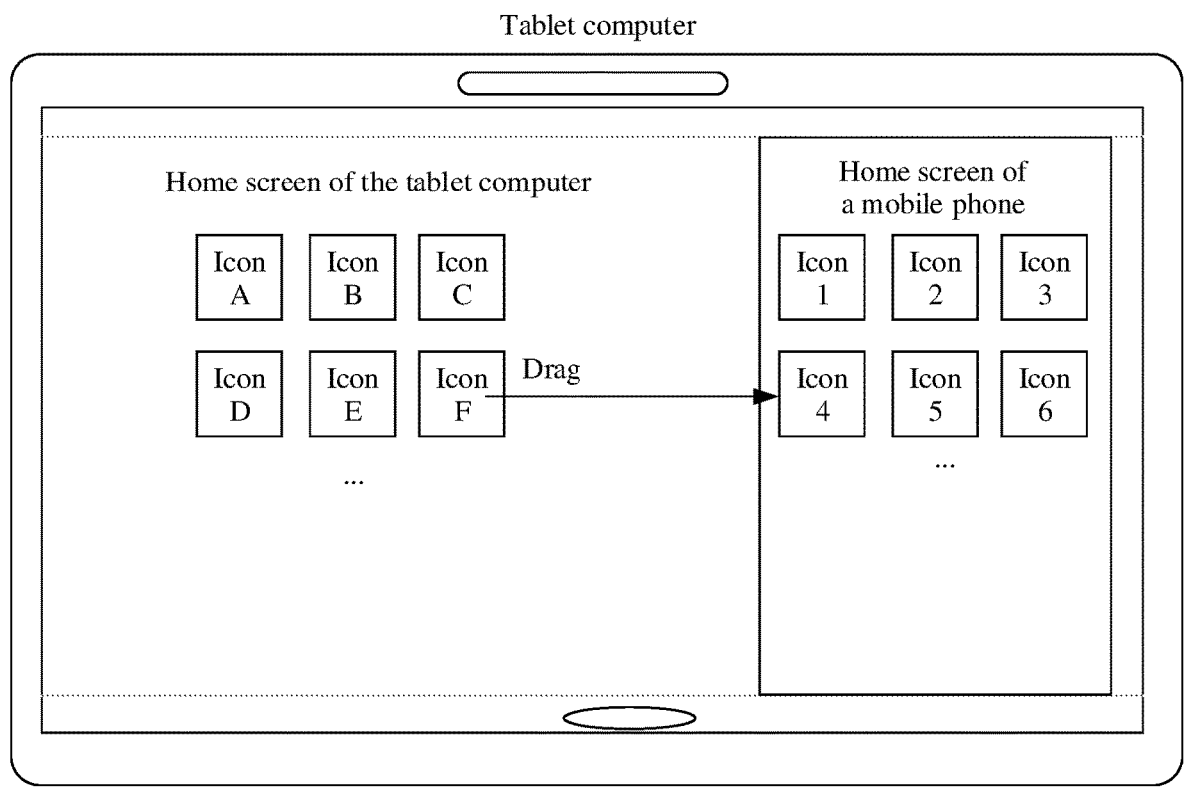
FIG. 12 is a schematic diagram of an operation of installing an application of a tablet computer on a mobile phone in the system shown in FIG. 9.

As shown in FIG. 12, if the user wants to install an application F of the tablet computer on the mobile phone, the user may tap, in the display interface of the tablet computer, an icon (Icon F) of the application F on a home screen of the tablet computer, and drag the icon rightward to a screen area of the mobile phone (FIG. 12 shows only a case in which the icon is dragged rightward, and actually, the icon may alternatively be dragged in another direction to the screen area of the mobile phone). After detecting an operation of the user, the tablet computer sends installation information of the application F to the mobile phone, so that the mobile phone automatically completes installation of the application F based on the installation information.

Figure 13:
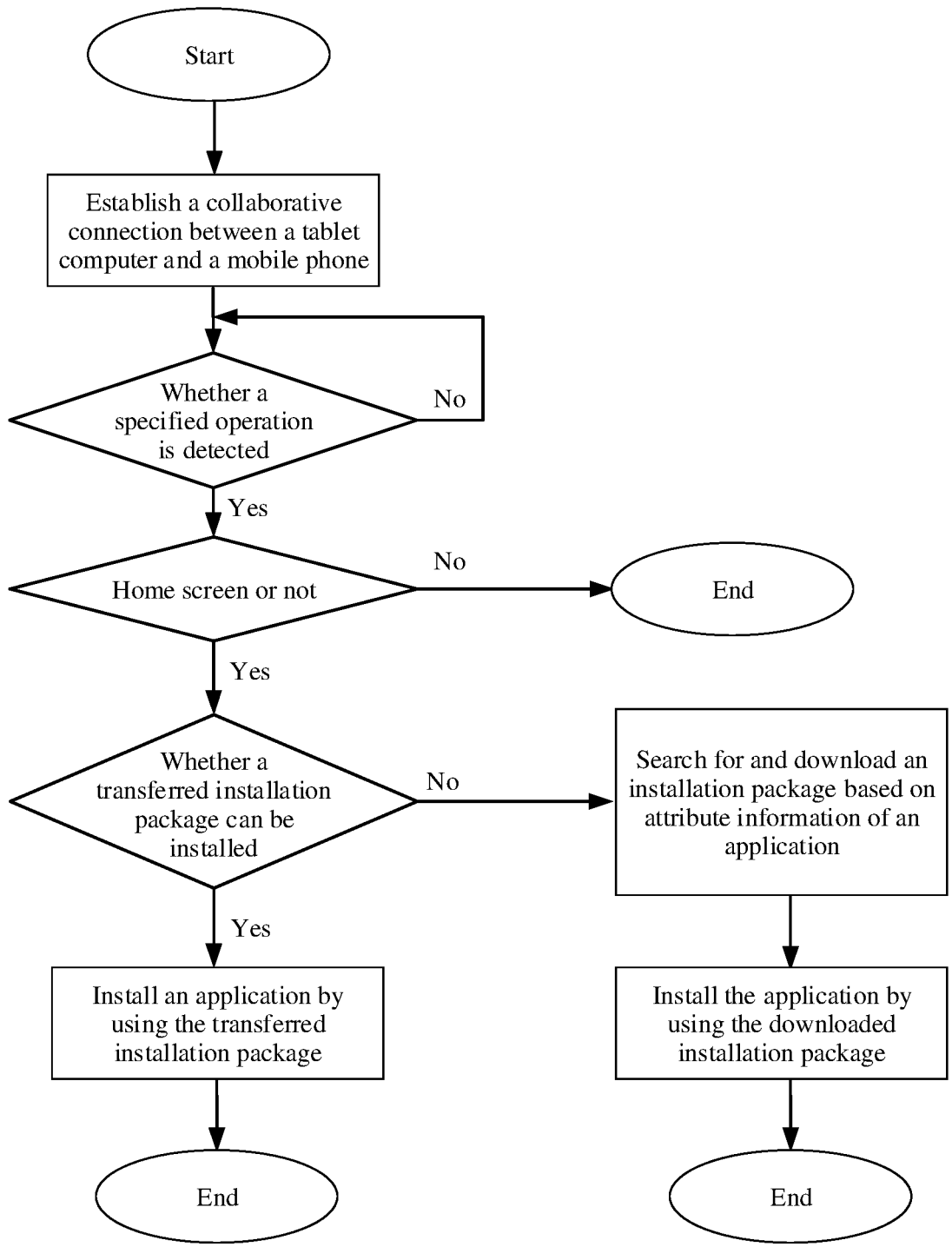
FIG. 13 is a schematic flowchart of performing the operation shown in FIG. 11 or FIG. 12.

A schematic flowchart of implementing the scenario in FIG. 11 or FIG. 12 is shown in FIG. 13.

In FIG. 13, in a scenario in which the application 5 of the mobile phone is installed on the tablet computer (the scenario in FIG. 11), if the specified operation of dragging the application icon 5 by the user is detected (for details, refer to the foregoing description), whether a display interface of the tablet computer is the home screen is first detected. If the display interface of the tablet computer is not the home screen, the detected specified operation is ignored, and a procedure ends; or if the display interface of the tablet computer is the home screen, whether an application installation package transferred by the mobile phone can be installed on the tablet computer is further determined. This may be determined by determining whether an operating system of the tablet computer is the same as an operating system of the mobile phone. If the application installation package on the mobile phone can be installed on the tablet computer, the tablet computer obtains the installation package of the application 5 from the mobile phone, and automatically installs the application 5 by using the installation package. If the application installation package on the mobile phone cannot be installed on the tablet computer, the tablet computer obtains attribute information such as a name of the application 5 from the mobile phone, then searches for and downloads, through a network, an installation package of the application 5 that complies with the operating system of the tablet computer, and finally completes installation of the application 5 by using the downloaded installation package.

In FIG. 13, in a scenario in which the application F of the tablet computer is installed on the mobile phone (the scenario in FIG. 12), if the specified operation of dragging the application icon F by the user is detected (for details, refer to the foregoing description), whether a display interface of the mobile phone is the home screen is first detected. If the display interface of the mobile phone is not the home screen, the detected specified operation is ignored, and a procedure ends; or if the display interface of the mobile phone is the home screen, whether an application installation package transferred by the tablet computer can be installed on the mobile phone is further determined. This may be determined by determining whether the operating system of the tablet computer is the same as the operating system of the mobile phone. If the application installation package on the tablet computer can be installed on the mobile phone, the mobile phone obtains the installation package of the application F from the tablet computer, and automatically installs the application F by using the installation package. If the application installation package on the tablet computer cannot be installed on the mobile phone, the mobile phone obtains attribute information such as a name of the application F from the tablet computer, then searches for and downloads, through a network, an installation package of the application F that complies with the operating system of the mobile phone, and finally completes installation of the application F by using the downloaded installation package.

When whether the display interface of the tablet computer or the mobile phone is the home screen is detected, a transferred window information data packet may be obtained, and whether the display interface is the home screen is determined based on a detected data packet name. When a file such as an application installation package is transferred between devices, a Wi-Fi p2p direct connection technology may be used to implement data transmission. In addition, if an application is installed on a device running an Android system, a corresponding apk file (or a base apk file, where even if a user deletes apk, there is still hidden base apk) exists in a specified directory of the device. Therefore, only the base apk file needs to be transferred, and the device does not need to separately store the corresponding apk file in another place. After receiving an installation file of the application, the device may use a package management service to install the received file. In addition, if the device receives attribute information of the application, the device may access a corresponding application store by using a network, automatically search for and jump to a download page based on the attribute information, and then trigger, by simulating a tap event, an automatic download, and an installation of the application.

The embodiments may provide a new method of installing an application across devices in all scenarios, so that application sharing between devices can be implemented in a multi-screen collaborative operation process. In addition, the operation is simple and practical.

Figure 14:
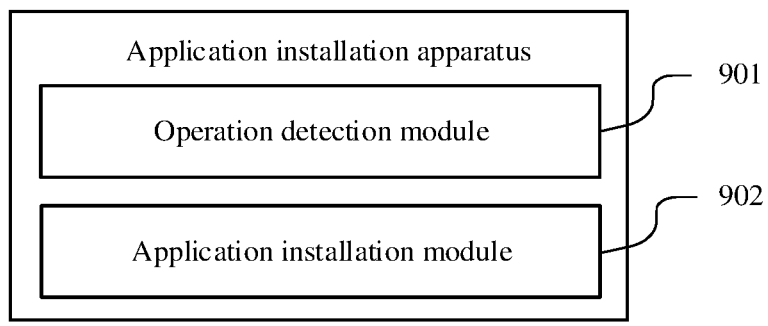
FIG. 14 is a diagram of a structure of an application installation apparatus according to an embodiment.

Corresponding to the application installation method in the foregoing embodiments, FIG. 14 is a block diagram of a structure of an application installation apparatus according to an embodiment. The apparatus is used in a first device. For ease of description, only a part related to this embodiment is shown.

As shown in FIG. 14, the apparatus includes:
an operation detection module 901, configured to obtain installation information of a first application from a second device when detecting a specified operation on the first application in a current display interface, where the first application is an application on a home screen of the second device, and the home screen of the second device is displayed in the current display interface of the first device; and
an application installation module 902, configured to install the first application based on the installation information of the first application.

Further, the operation detection module may be configured to detect an operation of dragging an icon of the first application in the current display interface to a target area, where the target area is an area in the current display interface of the first device other than an area in which the home screen of the second device is located.

Further, the application installation apparatus may further include:
an installation information sending module, configured to send installation information of a second application to the second device when an operation of dragging an icon of the second application in the target area to the area in which the home screen of the second device is located is detected, to indicate the second device to install the second application based on the installation information of the second application.

Further, the operation detection module may include:
an installation information obtaining unit, configured to obtain an installation package of the first application or attribute information of the first application from the second device if it is detected that the first application is not installed on the first device.

Correspondingly, the application installation module may include:
a first application installation unit, configured to install the first application by using the installation package of the first application if the installation package of the first application is obtained from the second device; or
a second application installation unit, configured to: if the attribute information of the first application is obtained from the second device, search the first device or a server for the installation package of the first application based on the attribute information, and install the first application by using the found installation package of the first application.

Further, the installation information obtaining unit may include:
an installation package availability detection subunit, configured to detect whether the installation package that is of the first application and that is obtained from the second device can be installed on the first device; and
a first installation information obtaining subunit, configured to obtain the installation package of the first application from the second device if it is detected that the installation package that is of the first application and that is obtained from the second device can be installed on the first device; or a second installation information obtaining subunit, configured to obtain the attribute information of the first application from the second device if it is detected that the installation package that is of the first application and that is obtained from the second device cannot be installed on the first device.

Further, the installation information obtaining unit may include:

an emulator detection subunit, configured to detect whether an emulator of the first application is installed on the first device; and an attribute information obtaining subunit, configured to obtain the attribute information of the first application from the second device if it is detected that the emulator of the first application is not installed on the first device; or an emulator-based installation subunit, configured to: if it is detected that the emulator of the first application is installed on the first device, obtain the installation package of the first application from the second device, and run the obtained installation package of the first application by using the emulator, to install the first application on the emulator.

Further, the installation package availability detection subunit may include:

an operating system detection sub-subunit, configured to detect whether an operating system of the first device is the same as an operating system of the second device; and a first availability determining sub-subunit, configured to: if the operating system of the first device is the same as the operating system of the second device, determine that the installation package that is of the first application and that is obtained from the second device can be installed on the first device; or a second availability determining sub-subunit, configured to: if the operating system of the first device is different from the operating system of the second device, determine that the installation package that is of the first application and that is obtained from the second device cannot be installed on the first device.

Further, the installation package availability detection subunit may include:

an installation package file name extension extraction sub-subunit, configured to extract a file name extension of the installation package that is of the first application and that is obtained from the second device; and a third availability determining sub-subunit, configured to determine, based on an operating system of the first device and the file name extension, whether the installation package that is of the first application and that is obtained from the second device can be installed on the first device.

An embodiment may further provide a non-transitory computer-readable storage medium. The non-transitory computer-readable storage medium stores a computer program, and when the computer program is executed by a processor, steps of the application installation method according to this application are implemented.

An embodiment may further provide a computer program product. When the computer program product runs on a terminal device, the terminal device is enabled to perform steps of the application installation method.

Figure 15:
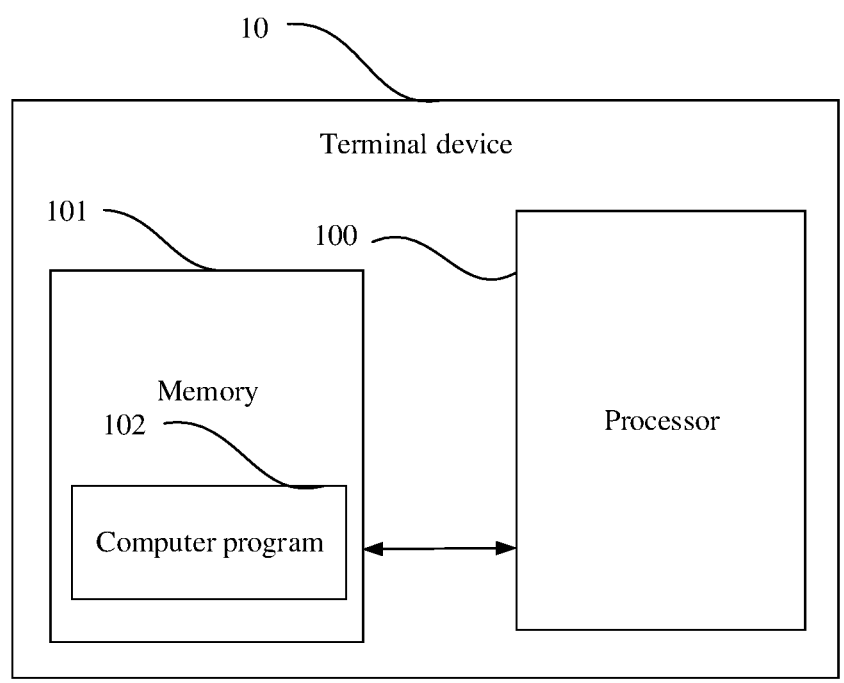
FIG. 15 is a schematic diagram of a terminal device according to an embodiment.

FIG. 15 is a schematic diagram of a structure of a terminal device according to an embodiment. As shown in FIG. 15, the terminal device 10 in this embodiment includes at least one processor 100 (only one processor is shown in FIG. 15), a memory 101, and a computer program 102 that is stored in the memory 101 and that can be run on the at least one processor 100. When executing the computer program 102, the processor 100 implements steps in any one of the foregoing application installation method embodiments.

The terminal device 10 may be a computing device such as a mobile phone, a desktop computer, a notebook computer, a palmtop computer, or a cloud server. The terminal device may include, but is not limited to, the processor 100 and the memory 101. A person skilled in the art may understand that FIG. 15 is merely an example of the terminal device 10 and does not constitute a limitation on the terminal device 10. The terminal device may include more or fewer components than those shown in the figure, or some components may be combined, or different components may be used. For example, the terminal device may further include an input/output device or a network access device.

The processor 100 may be a central processing unit (CPU). The processor 100 may alternatively be another general-purpose processor, a digital signal processor (DSP), an application-specific integrated circuit (ASIC), a field-programmable gate array (FPGA) or another programmable logic device, a discrete gate or a transistor logic device, or a discrete hardware component. The general-purpose processor may be a microprocessor, or the processor may be any conventional processor or the like.

In some embodiments, the memory 101 may be an internal storage unit of the terminal device 10, for example, a hard disk drive or internal storage of the terminal device 10. In some other embodiments, the memory 101 may alternatively be an external storage device of the terminal device 10, for example, a plug-in hard disk, a smart media card (SMC), a secure digital (SD) card, or a flash card that is provided on the terminal device 10. Further, the memory 101 may include both the internal storage unit and the external storage device that are of the terminal device 10. The memory 101 is configured to store an operating apparatus, an application, a bootloader, data, and another program, for example, program code of the computer program. The memory 101 may further be configured to temporarily store output data or to-be-output data.

A person skilled in the art may clearly understand that, for the purpose of convenient and brief description, division into the foregoing function units or modules is merely used as an example for illustration. During actual application, the foregoing functions may be allocated to different function units or modules for implementation based on a requirement, that is, an inner structure of an apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware or may be implemented in a form of a software functional unit. In addition, names of the function units and modules are merely for ease of distinguishing between the function units and modules, but are not intended to limit the scope of the embodiments. For a working process of the units and modules in the foregoing apparatus, refer to a corresponding process in the foregoing method embodiments. Details are not repeatedly described herein.

In the foregoing embodiments, the descriptions of the embodiments have respective focuses. For a part that is not described in detail or recorded in an embodiment, refer to related descriptions in other embodiments.

A person of ordinary skill in the art may be aware that, in combination with the examples described in embodiments, units and algorithm steps can be implemented by electronic hardware or a combination of computer software and electronic hardware. Whether the functions are performed by hardware or software depends on particular applications and constraints of the solutions. A person skilled in the art may use different methods to implement the described functions for each particular application, but it should not be considered that the implementation goes beyond the scope of the embodiments.

In the embodiments, it should be understood that the apparatus and method may be implemented in another manner. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and parts displayed as units may or may not be physical units, may be located in one place, or may be distributed on a plurality of network units. Some or all of the units may be selected based on actual requirements to achieve the objectives of the embodiments.

In addition, function units in embodiments may be integrated into one processing unit, or each of the units may exist alone physically, or two or more units may be integrated into one unit. The integrated unit may be implemented in a form of hardware or may be implemented in a form of a software functional unit.

When the integrated unit is implemented in a form of a software functional unit and sold or used as an independent product, the integrated unit may be stored in a computer-readable storage medium. Based on such an understanding, all or some of the processes of the method in embodiments may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry the computer program code to a terminal device, a recording medium, a computer memory, a read-only memory (ROM), a random access memory (RAM), an electrical carrier signal, a telecommunications signal, and a software distribution medium, for example, a USB flash drive, a removable hard disk, a magnetic disk, or an optical disk. In some jurisdictions, the computer-readable medium cannot be the electrical carrier signal or the telecommunications signal according to legislation and patent practices.

The foregoing embodiments are merely intended to describe the solutions, but not to limit. Although described in detail with reference to the foregoing embodiments, persons of ordinary skill in the art should understand that they may still make modifications to the foregoing embodiments or make equivalent replacements to some features thereof, without departing from the spirit and scope of the embodiments, and these modifications and replacements shall fall within the scope of the embodiments.

What is claimed is:

1. An application installation method comprising:
    obtaining, by a first device, installation information of a first application from a second device when the first device detects a specified operation on the first application in a current display interface, wherein the first application is an application on a home screen of the second device, and the home screen of the second device is displayed in the current display interface of the first device;
    wherein the specified operation on the first application in the current display interface further comprises:
    an operation of dragging an icon of the first application in the current display interface to a target area, wherein the target area is an area in the current display interface of the first device other than an area in which the home screen of the second device is located; and
    installing, by the first device, the first application based on the installation information of the first application.

2. The application installation method according to claim 1, further comprising:
    sending, by the first device, installation information of a second application to the second device when the first device detects an operation of dragging an icon of the second application in the target area to the area in which the home screen of the second device is located, to indicate the second device to install the second application based on the installation information of the second application.

3. The application installation method according to claim 1, wherein obtaining, by the first device, the installation information of the first application from the second device further comprises:
    obtaining, by the first device, an installation package of the first application from the second device when the first device detects that the first application is not installed on the first device; and installing, by the first device, the first application based on the installation information of the first application further comprises:
    installing, by the first device, the first application by using the installation package of the first application.

4. The application installation method according to claim 3, wherein obtaining the installation package of the first application from the second device further comprises:
    detecting, by the first device, whether the installation package that is of the first application and that is obtained from the second device can be installed on the first device; and
    obtaining, by the first device, the installation package of the first application from the second device when the first device detects that the installation package that is of the first application and that is obtained from the second device can be installed on the first device.

5. The application installation method according to claim 1, wherein obtaining, by the first device, the installation information of the first application from the second device further comprises:
    obtaining, by the first device, attribute information of the first application from the second device when the first device detects that the first application is not installed on the first device; and installing, by the first device, the first application based on the installation information of the first application further comprises:

searching, by the first device, the first device or a server for the installation package of the first application based on the attribute information; and installing the first application by using the found installation package of the first application.

6. The application installation method according to claim 5, wherein obtaining the attribute information of the first application from the second device further comprises:

detecting, by the first device, whether the installation package that is of the first application and that is obtained from the second device can be installed on the first device; and obtaining, by the first device, the attribute information of the first application from the second device when the first device detects that the installation package that is of the first application and that is obtained from the second device cannot be installed on the first device.

7. The application installation method according to claim 6, further comprising:

detecting, by the first device, whether an emulator of the first application is installed on the first device; and obtaining, by the first device, the attribute information of the first application from the second device when the first device detects that the emulator of the first application is not installed on the first device.

8. The application installation method according to claim 3, wherein obtaining the installation package of the first application from the second device further comprises:

when the first device detects that the installation package that is of the first application and that is obtained from the second device cannot be installed on the first device, and when the first device detects that the emulator of the first application is installed on the first device, obtaining, by the first device, the installation package of the first application from the second device, and running the obtained installation package of the first application by using the emulator, to install the first application on the emulator.

9. The application installation method according to claim 4, wherein detecting, by the first device, whether the installation package that is of the first application and that is obtained from the second device can be installed on the first device further comprises:

detecting, by the first device, whether an operating system of the first device is the same as an operating system of the second device; and when the operating system of the first device is the same as the operating system of the second device, determining, by the first device, that the installation package that is of the first application and that is obtained from the second device can be installed on the first device.

10. The application installation method according to claim 4, wherein detecting, by the first device, whether the installation package that is of the first application and that is obtained from the second device can be installed on the first device further comprises:

extracting, by the first device, a file name extension of the installation package that is of the first application and that is obtained from the second device; and determining, by the first device based on an operating system of the first device and the file name extension, whether the installation package that is of the first application and that is obtained from the second device can be installed on the first device.

11. The application installation method according to claim 6, wherein detecting, by the first device, whether the installation package that is of the first application and that is obtained from the second device can be installed on the first device further comprises:

detecting, by the first device, whether an operating system of the first device is the same as an operating system of the second device; and when the operating system of the first device is different from the operating system of the second device, determining, by the first device, that the installation package that is of the first application and that is obtained from the second device cannot be installed on the first device.

12. The application installation method according to claim 6, wherein detecting, by the first device, whether the installation package that is of the first application and that is obtained from the second device can be installed on the first device further comprises:

extracting, by the first device, a file name extension of the installation package that is of the first application and that is obtained from the second device; and determining, by the first device based on an operating system of the first device and the file name extension, whether the installation package that is of the first application and that is obtained from the second device can be installed on the first device.

13. A terminal device, comprising:

a processor; and a non-transitory computer readable medium which contains computer-executable instructions;

the processor is configured to execute the computer-executable instructions to enable the terminal device to perform operations comprising:

obtaining installation information of a first application from a second device when the first device detects a specified operation on the first application in a current display interface, wherein the first application is an application on a home screen of the second device, and the home screen of the second device is displayed in the current display interface of the first device;

wherein the specified operation on the first application in the current display interface further comprises:

an operation of dragging an icon of the first application in the current display interface to a target area, wherein the target area is an area in the current display interface of the first device other than an area in which the home screen of the second device is located; and installing the first application based on the installation information of the first application.

14. The terminal device according to claim 13, wherein the processor is further configured to execute the computer-executable instructions to enable the terminal device to perform an operation comprising:

sending installation information of a second application to the second device when the first device detects an operation of dragging an icon of the second application in the target area to the area in which the home screen of the second device is located, to indicate the second device to install the second application based on the installation information of the second application.

15. The terminal device according to claim 13, wherein obtaining, by the first device, the installation information of the first application from the second device further comprises:

obtaining an installation package of the first application or attribute information of the first application from the second device when the first device detects that the first application is not installed on the first device; and installing the first application based on the installation information of the first application further comprises:

installing the first application by using the installation package of the first application if the first device obtains the installation package of the first application from the second device; or when the first device obtains the attribute information of the first application from the second device, searching the first device or a server for the installation package of the first application based on the attribute information, and installing the first application by using the found installation package of the first application.

16. The terminal device according to claim 15, wherein obtaining the installation package of the first application or the attribute information of the first application from the second device further comprises:

detecting whether the installation package that is of the first application and that is obtained from the second device can be installed on the first device; and obtaining the installation package of the first application from the second device when the first device detects that the installation package that is of the first application and that is obtained from the second device can be installed on the first device; or obtaining the attribute information of the first application from the second device when the first device detects that the installation package that is of the first application and that is obtained from the second device cannot be installed on the first device.

17. The terminal device according to claim 16, wherein detecting whether the installation package that is of the first application and that is obtained from the second device can be installed on the first device further comprises:

detecting whether an operating system of the first device is the same as an operating system of the second device; and when the operating system of the first device is the same as the operating system of the second device, determining that the installation package that is of the first application and that is obtained from the second device can be installed on the first device; or when the operating system of the first device is different from the operating system of the second device, determining that the installation package that is of the first application and that is obtained from the second device cannot be installed on the first device.

18. A non-transitory computer-readable storage medium, wherein the non-transitory computer-readable storage medium stores a computer program, and the computer program, when executed by a processor, enables the terminal device to perform operations comprising:

obtaining installation information of a first application from a second device when the first device detects a specified operation on the first application in a current display interface, wherein the first application is an application on a home screen of the second device, and the home screen of the second device is displayed in the current display interface of the first device;

wherein the specified operation on the first application in the current display interface further comprises:

an operation of dragging an icon of the first application in the current display interface to a target area, wherein the target area is an area in the current display interface of the first device other than an area in which the home screen of the second device is located; and installing the first application based on the installation information of the first application.

* * * * *